INVENTOR
YOICHIRO ITO
BY
ATTORNEY.

United States Patent Office 3,420,436
Patented Jan. 7, 1969

3,420,436
APPARATUS FOR FLUID TREATMENT BY UTILIZING THE CENTRIFUGAL FORCE
Yoichiro Ito 28, 1-chome, Nishi-taka-aicho, Sumiyoshi-ku, Osaka, Japan
Filed Sept. 24, 1965, Ser. No. 489,931
U.S. Cl. 233—17
Int. Cl. B04b 5/02
3 Claims

ABSTRACT OF THE DISCLOSURE

Apparatus for fluid treatment utilizing centrifugal force comprising a turning disc and a high speed disc motor connecting to the turning disc for turning the disc. An annular container is provided for holding fluid therein and a shaft rigidly connected to the container, which shaft is rotatably mounted on the turning disc eccentrically away from the center of the turning disc. A shaft motor is provided for rotating the shaft and the annular container about its axis independently of the turning of the turning disc by the disc motor so that the annular container revolves while rotating with various predetermined angular velocity.

---

The present invention relates to an apparatus for fluid treatment utilizing centrifugal force in general, and to an apparatus for fluid treatment utilizing centrifugal force, wherein an annular container for the fluid to be treated is mounted eccentrically on a high speed turning disc in such a way that it revolves with the latter while it also rotates itself with any required angular velocity in particular.

It is one object of the present invention to provide an apparatus for fluid treatment utilizing centrifugal force comprising a turning disc, a high speed disc motor means connected to the turning disc for turning the turning disc, at least one annular container for holding fluid therein, a shaft rigidly secured to the at least one annular container, the shaft rotatably mounted on the turning disc eccentrically away from the center of the turning disc, and shaft motor means for rotating the at least one annular container independently of the turning of the turning disc so that the annular container revolves while rotating with various desired angular velocity.

With this and other objects in view, which will become apparent in the following detailed description, the present invention will be clearly understood in connection with the accompanying drawings, in which.

Figure 1:
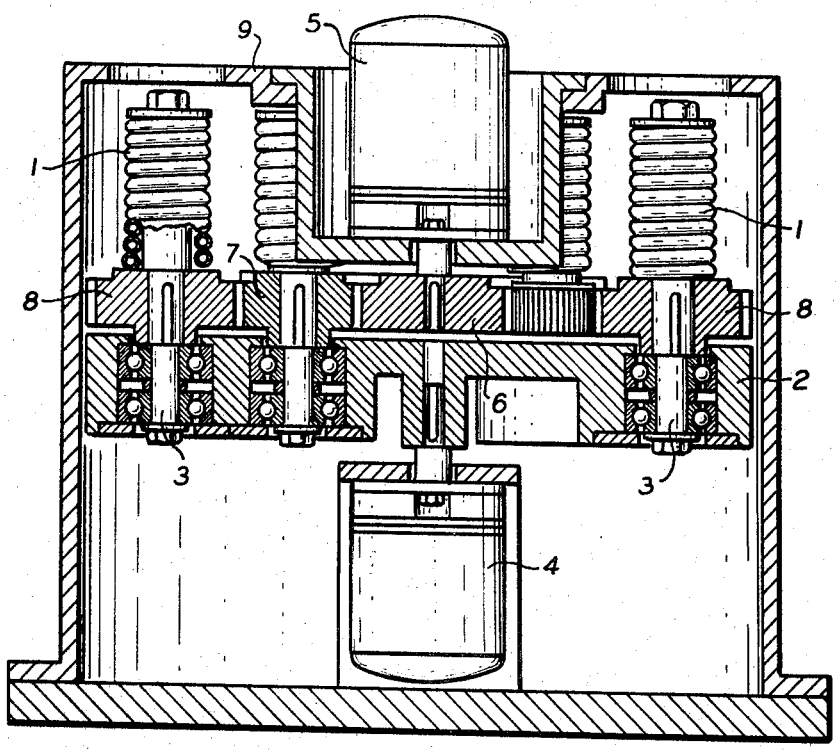
FIGURE 1 is a section of FIG. 2 taken along the lines A—A.
Figure 2:
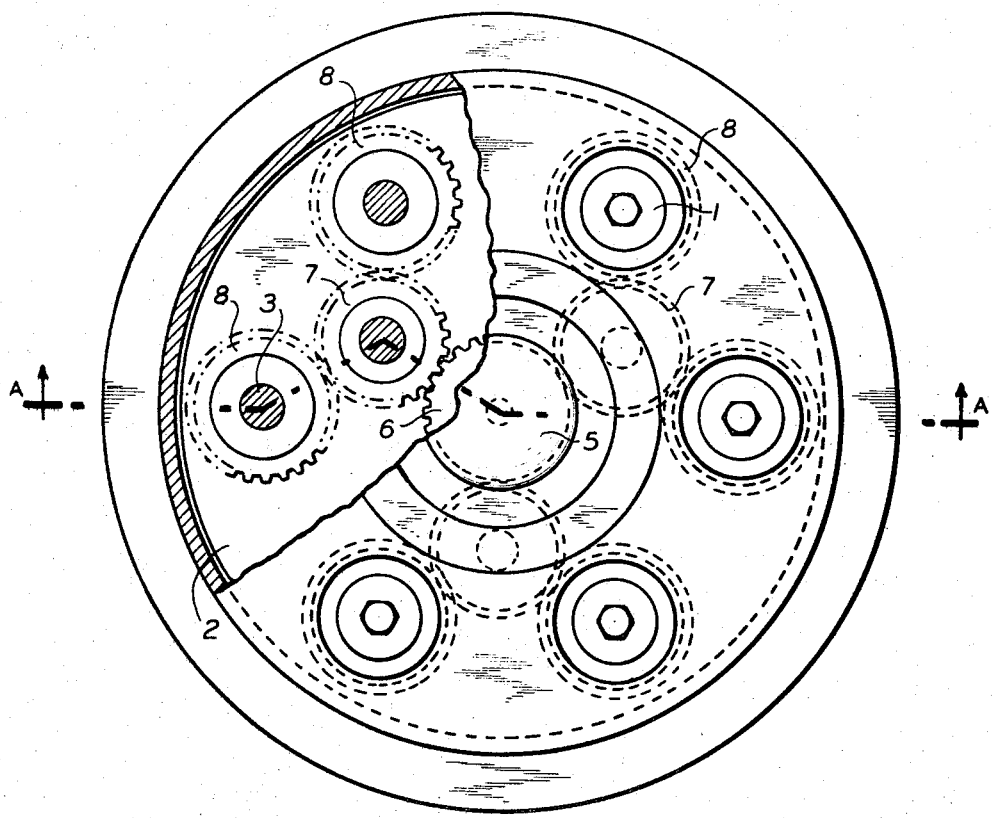
FIG. 2 is a partly notched plan view of an apparatus according to the present invention.

Referring now to the drawings, and more particularly to FIG. 1, annular containers 1, 1 are fixed to shafts 3, 3 which are loosely mounted near the peripheral brim of a turning disc 2 which is driven directly by a motor 4 in a way similar to that of a conventional centrifuge. The shafts 3, 3 are provided with another motor 5 concentric with the motor 4. The motor 5 and the shafts 3, 3 are arranged to engage with gears 6, 7, 7, and 8, 8 among which miter gears are used for the gears 6 and 8, 8.

When the motor 5 which drives the containers 1 and the motor 4 which drives the turning disc 2 is running in the same direction, the annular containers 1, 1 act as one rigid body with the turning disc 2 and the gears 6, 7, 7 and 8, 8 do not rotate at all relative the turning disc 2. If the numbers of rotations of both motors 4 and 5 are so arranged as to allow a lag between them, it will be understood that the annular containers 1, 1 will rotate according to the difference between the number of rotations, while they revolve together with the turning disc 2. In other words, if the number of rotations of both motors are determined respectively, the container 1 can be made to rotate according to the difference between the number of rotations of both motors.

Figure 3:
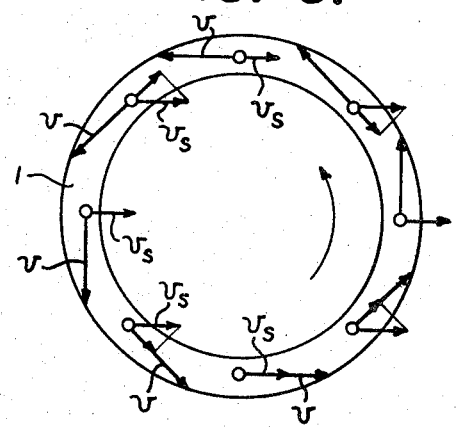
FIG. 3 is a kinematical diagram of the particles in the rotary container.

According to the invention a peculiar phenomena appears in the fluid in the annular container which is subjected to the centrifugal force. As shown in FIG. 3, the fluid rotates with the container 1 and, every time it passes the far and near extremities of the container, the direction of acceleration changes. With both extremities as borders, the particles in the fluid will slowly follow the rotation of fluid, while they are accelerated by the centrifugal force to settle down. But, as they pass the proximal extremity, the direction of the centrifugal force changes to be the same as that of the rotation, and this time they float away, quickly turning toward the distant extremity. If measured by time, it takes a longer time for the particles to settle down than to float up, and this phenomenon is repeated every time they are rotated.

The fluid sample to be treated by the apparatus according to the invention is complicated in its density and grain size. The settling velocity of each particle $v_s$ can be shown by the following Stokes formula, if the effect of rotation is not considered:

$$v_s = \frac{2(\rho - \rho_0)r^2}{9\eta} g$$

wherein:

R = radius of the particle
$\rho - \rho_0$ = difference in density of the mother fluid and the particles
$\eta$ = viscosity of the mother fluid
$g$ = centrifugal acceleration.

However, when the above-mentioned $v_s$ is further affected by the rotation speed $v$, the settling velocity in the present apparatus becomes as follows:

$$V = \frac{v_s^2}{2v}$$

Since the settling velocity V becomes proportional to $v_s^2$ as shown by the above formula, when the effect of rotation is taken into consideration, it is evident that, in comparison with the conventional settling method of the particles, a far remarkable settling difference for a minute difference between the radii of the particle and the density can be obtained.

In the present apparatus, it appears that, if the rotation speed $v$ is made smaller, V can be made as large as desired. But, all the articles which have $v_s$ that is larger than y remain on the settling side of the annular container and it becomes impossible to make a settling separation by means of the difference in their grain size or density. In order to eliminate such a defect, the rotation speed $v$ in the present apparatus should be determined to be always larger than the anticipated maximum value of $v_s$.

The annular container 1 to be used in the present invention is theoretically endless. But, the one which can meet various purpose of use is a long flexible tube with both ends closed up. It is the tank which has a small diameter and a long settling depth and which is annularly wound round so as to form a continuous body of the annular containers with both ends closed up. By the use of a small volume of the sample, the tank can make a settling separation having a gently and subtle inclination and a long depth.

Further when two samples are used in the present apparatus, such interfacial phenomena as mixture, solution, adsorption and diffusion etc. can be conducted by utilizing the acceleration of the centrifugal force, and valuable scientific data can be quickly obtained. Especially in case of the rotary container of a double coil structure with a slender tube which has such a dimension as 1 mm. in diameter and 5 m. in length and which is annularly wound round the rotary shaft 3 so as to be 50 cm. long, the sample that has been treated can form a continuous distribution in a closely adhered loop in a state compressed from its depth of 5 m. to the length of 50 cm., which permits the subsequent treatment to be easy and simple. In addition, it is possible to preserve the sample in the tube for a long time as it is, because of it is held in a minute tube and restricted to make a free movement afterward.

At present the centrifugal appartaus according to the present invention wherein a long circular tube is made to rotate has various uses as follows:

(1) In order to separate the particles in a single fluid, mixed samples of small and large as well as light and heavy particles are put into the lower end of the tube and fit in the present apparatus, in which case the tube extends several meters in contrast to the conventional tank having the length of only 10 to 20 cm., and it can effect a subtle and continuous settling in proportion to $v_s^2$.

(2) When the tube containing two mutually miscible fluids, for instance, a thicker fluid put in one half of the tube and a thinner fluid in the other half, is fit in the present contrifugal apparatus, both fluids will be gradually mixed up from their central boundary surface to have a smoothly inclined density, viscosity and solute density and, by utilizing the smooth inclination, the particles will be injected into the end of thinner fluid in order to get a smooth density inclination having a suspension separated into respective portions of a suitable density. When one half of the tube is filled with the thick fluid of salt and a sample, while the other half with water, and the tube is fit in the present apparatus, a delicate inclination of solution of the sample which corresponds to the density inclination of salt can be obtained, which is considered to be a new salting-in method.

(3) It is possible to conduct a counter current analysis by the use of two mutually immiscible fluids. In the conventional counter current analysis, complicated and expensive instruments have to be used, requiring a large volume of a solvent and complicated trouble. In contrast to such a conventional process, the present apparatus permits one to make the analysis by the use of the tube of a double coil structure and with a small volume of the sample and by a simple process, and more economically and efficiently.

(4) With fluid filled in one half of the tube and the carrier particles in the other half, the present apparatus can be used in adsorption chromatograph.

As above described, in place of the conventional apparatus used in various scientific experiments, the present apparatus permits delicate scientific data to be obtained especially with a small volume of sample and by a simple process. Therefore the present invention is expected with reason to have various scientific uses in the future.

While I have disclosed several embodiments of the present invention, it is to be understood that these embodiments are given by example only and not in a limiting sense, the scope of the present invention being determined by the objects and the claims.

What I claim is:

1. An apparatus for fluid treatment utilizing centrifugal forces, comprising
    a turning disc,
    a high speed disc motor means connected to said turning disc for rotating said turning disc,
    an annular, helical and closed container for holding fluid therein,
    a shaft rigidly connected to said annular container,
    said shaft rotatably mounted on said turning disc eccentrically away from said turning disc,
    the axis of rotation of said annular container is disposed substantially parallel to the axis of rotation of said turning disc, and
    means for rotating said annular container relatively to said turning disc, so that said annular container revolves while rotating with a predetermined relative angular velocity.

2. The apparatus, as set forth in claim 1, wherein
    said annular container comprises a body including a flowing path disposed spirally about the rotating axis of said container.

3. The apparatus, as set forth in claim 1, wherein
    said means for rotating said annular container relatively to said turning disc includes means for rotating said annular container at a lower speed than that of said turning disc.

References Cited

UNITED STATES PATENTS

| | | | |
|---|---|---|---|
| 1,308,271 | 7/1919 | Baylis | 233—25 |
| 2,822,127 | 2/1958 | Sinn | 233—25 XR |
| 3,311,295 | 3/1967 | Rubissow | 233—25 |
| 1,566,770 | 12/1925 | Packer | 233—17 |
| 1,861,878 | 6/1932 | Quiroz | 233—25 |
| 2,730,299 | 1/1956 | Kelsey | 233—27 XR |
| 3,129,175 | 4/1964 | Jones et al. | 233—28 |

HENRY T. KLINKSIEK, *Primary Examiner.*

U.S. Cl. XR.

233—27